United States Patent
Berglund et al.

(10) Patent No.: US 6,351,819 B1
(45) Date of Patent: Feb. 26, 2002

(54) HETEROGENEOUS SYSTEM ENCLOSURE SERVICES CONNECTION

(75) Inventors: Neil Clair Berglund, Kasson; Ronald Leroy Billau; David Lee Dosch, both of Rochester; Brian Gerard Holthaus, Oronoco; Thomas James Osten; Frederick Joseph Ziecina, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/267,778

(22) Filed: Mar. 15, 1999

(51) Int. Cl.[7] .................................................. G06F 1/26
(52) U.S. Cl. ....................................... 713/310; 709/203
(58) Field of Search ........................... 710/9, 100, 129; 713/310, 340; 709/203, 217; 714/13

(56) References Cited

U.S. PATENT DOCUMENTS

| | | | | |
|---|---|---|---|---|
| 5,117,430 A | | 5/1992 | Berglund | .................... 370/85.1 |
| 6,055,581 A | * | 4/2000 | Berglund et al. | ............. 710/11 |
| 6,122,256 A | * | 9/2000 | Berglund | .................... 370/241 |
| 6,158,020 A | * | 12/2000 | Locker et al. | ................. 714/13 |

FOREIGN PATENT DOCUMENTS

EP          0517403 A2    12/1992    ........... G06F/11/22

OTHER PUBLICATIONS

Berglund; "Method and apparatus for correlating computer system device physical location with logical address"; US Patent Application 08/971,687; filed Nov. 17, 1997.

Berglund; "Fail–Safe Comminications Network For Use in System Power Control"; US Patent Application 08/912,561; filed Aug. 17, 1997.

* cited by examiner

*Primary Examiner*—Glenn A. Auve
(74) *Attorney, Agent, or Firm*—Christopher H. Lynt; Matthew J. Bussan (57) ABSTRACT

An adapter node is provided for use in adapting internal system enclosure services to a system power control network to thereby provide remote power control, diagnostics, and logical-to-physical correlation information, through the system power control network. The adapter node is for use in one computer of a plurality of different types of computers, having a respective internal system enclosure services low-level communication path. The power control network has a plurality of nodes, one of the nodes being a control node. The adapter node includes a substrate having electrical contacts adapted to plug to a system bus in the one computer. The substrate further has at least one system enclosure services interface connection to connect to the internal system enclosure services low-level communication path in the one computer. The adapter node further has a system power control network interface connection for connecting to the system power control network. A processor of the adapter node is provided for coordinating communication with the system power control network and with internal devices on the internal system enclosure services low-level communications path. Power control, diagnostics, and logical-to-physical correlation information signals are communicated between the system power control system control node and the adapter node to provide system enclosure services support to the one computer of the plurality of different types of computers.

30 Claims, 3 Drawing Sheets

HETEROGENEOUS SYSTEM ENCLOSURE SERVICES CONNECTION

CROSS-REFERENCE TO RELATED APPLICATIONS

The present application is related to application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS", now U.S. Pat. No. 6,044,411, and to application Ser. No. 08/912,561, filed Aug. 18, 1997, entitled "FAIL-SAFE COMMUNICATIONS NETWORK FOR USE IN SYSTEM POWER CONTROL", now U.S. Pat. No. 6,122,256, both of which are assigned to the same assignee as the present application.

BACKGROUND OF THE INVENTION

1. Field of The Invention

The invention relates to the field of computer system hardware maintenance and management, and in particular, to the integration of heterogeneous computer systems into a single computer maintenance and management system.

2. Background Information

The computer industry is presently expanding on approaches for providing System Enclosure Services (SES) in computer systems. As is generally understood in the art, System Enclosure Services refers to a number of computer system enclosure hardware maintenance and management/control functions, such as power supply and cooling system control.

As one example of a system enclosure services implementation, the American National Standard for Information Systems (ANSI) has proposed a model SES for Small Computer System Interconnect (SCSI) access to system services, i.e., power, cooling, indicators, etc., within an enclosure containing one or more SCSI devices, e.g., direct access storage devices (DASD's—hard disk drives), which is described in the working draft entitled "SES SCSI Enclosure Services," X3T10/Project 1212-d/Rev 8a, Jan. 18, 1997. SCSI is a known bus standard.

System Enclosure Services (SES) includes a group of related functions aimed at, for example, sensing and controlling power and cooling apparatus, as well as managing vital product data (VPD) information, within a computer system. VPD is, generally speaking, hardware component identification information, such as the type of component, the model number, etc. A hardware component which can be serviced after a computer system has been assembled and delivered may be referred to herein as a field replaceable unit (FRU). The term FRU includes peripheral devices such as a floppy disk drive, for example, but also may include power supplies, input/output card devices, e.g., disk drive controllers and bus adapters, and even motherboards and backplanes. The associated VPD serves to identify an FRU so that particular characteristics of the FRU can be determined and taken into account in performing maintenance.

System Enclosure Services are generally provided by enabling low-level communication paths inside a computer enclosure and between computer enclosures, in the case of a computer system with multiple enclosures. In other words, the services are generally provided using a low-level network, which will be referred to as an SES network.

A typical SES network implementation would include a central Server node and multiple Workstation and PC (personal computer) nodes, for example. The SES Server node performs a variety of supervisory functions, such as managing the VPD information, e.g., collecting and configuring the VPD information, controlling power supplies, e.g., turning the power supplies ON and OFF, controlling cooling fans, and sensing component failures throughout the network, via the other network nodes.

A system power control network (SPCN) is known from U.S. Pat. No. 5,117,430, and from copending application Ser. No. 08/912,561, filed Aug. 18, 1997, entitled "FAIL-SAFE COMMUNICATIONS NETWORK FOR USE IN SYSTEM POWER CONTROL", now U.S. Pat. No. 6,122,256, both of which are assigned to the same assignee as the present application. The SPCN communications network is a low volume serial network used to monitor and control power conditions at a plurality of nodes in a computer system, for example, the IBM AS/400 (IBM and AS/400 are registered trademarks of International Business Machines Corporation). The nodes typically include microprocessors which monitor the status of, and make occasional adjustments to, the power conditions at the respective nodes. The SPCN, therefore, by definition inherently provides system enclosure services and can be seen as an implementation of an SES network.

It is further known to use vital product data (VPD) for correlating the physical locations of system components with their corresponding logical addresses in a computer system, from the copending patent application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS", now U.S. Pat. No. 6,044,411, assigned to the same assignee as the present application. As described therein, memory, e.g., non-volatile random access memory (NVRAM), is provided on a backplane (e.g., a PCI backplane) and written with VPD information, such as the type of backplane, manufacture date, backplane serial number, type of slots on the backplane, etc., and this information is retained for use by the operating system if and when needed for service actions, upgrades, or for on-line configuration management and order processing.

Further, the VPD information may advantageously be accessed, for example, using an SPCN such as are disclosed in the above-mentioned U.S. Pat. No. 5,117,430 and in the other related application Ser. No. 08/912,561 (now U.S. Pat. No. 6,122,256).

A variety of adapter/connector/bus types and standards are known, and one of these is the peripheral component interconnect (PCI) standard. The PCI bus is a synchronous, processor independent, 32- or 64-bit bus (128-bit is imminent) that functions similarly to a processor local bus. The PCI bus can be thought of as a buffered intermediate or so-called mezzanine bus, that is, an extension of the processor local bus. It is coupled to the personal computer processor local bus by so-called "bridge" circuitry, but maintains its own separate set of circuits. The original PCI bus specification required a constant speed of 33 MHz, which translates to a transfer rate of 80–120 Mbs in a 32-bit environment, and up to a 264 Mbs transfer rate in a 64-bit environment. The PCI bus operates on 5 volts, 3.3 volts, or both. A 66 MHz PCI bus is now used, and 133 MHz is expected to be the next bus speed available.

Other standard types include ISA (Industry Standard Architecture—8/16 bits) and EISA (Expanded ISA—32 bits), SCSI (Small Computer System Interconnect), MCA (Micro Channel Architecture), VLB (VESA—Video Electronics Standard Association—Local Bus), AGP (Accelerated Graphics Port), and USB (Universal System Bus), to name just a few of the more prominent. The bus types generally have different maximum bus speeds, and newer bus types generally have higher bus speeds. For comparison purposes, the bus speeds can be referenced by the quantity of data transferred per second. The original IBM PC (IBM is a registered trademark of International Business Machine Corporation) had a bus speed of about 1 megabyte per second, the IBM AT about 4 megabytes per second, a typical ISA bus about 8 megabytes to a maximum of 16 megabytes per second, the EISA bus has 32 megabytes per second, the MCA bus 20–40 megabytes per second, the VESA VL-1 has 20–132 megabytes per second, the VESA VL-2 up to 264 megabytes per second, the PCI version 1.0 has 80–120 megabytes per second and the PCI version 2.0 up to 264 megabytes per second. Bus speeds can also be quantified by their clock frequency, e.g., in mega-Hertz (MHz).

Currently in the industry there are various initiatives to attempt to achieve the 'lowest-cost' Server network while achieving the highest possible form of 'systems-management,' such as the NetPC and Network Station paradigms. A few exemplary initiatives in this area are Microsoft's ZAW (Zero Administration for Windows), Intel's DMI (Desktop Management Interface), and Intel's IPMI (Intelligent Platform Management Interface). IPMI describes interfaces and a specific software command/register set running on DMI compliant hardware to perform SES functions. ZAW is application middleware that takes advantage of IPMI and DMI to enhance Systems Management features that ultimately lower the "TCO" (Total Cost of Ownership) of a Server network. Further information about these efforts/implementations can be obtained from their respective manufacturers.

These "homogeneous" concepts of SES, i.e., in network computers using the same operating system, have expanded to incorporate intelligent and in some cases 'peer' processing nodes in a variety of Server chassis. Intel's IPMI (Intelligent Platform Management Interface) and SSI (System Server Infrastructure), as well as the IBM PC Company Service Processor, and IBM's AS/400 SES, are examples of this expansion.

However, one problem or limitation in the above efforts is the inability to use an SES Server node from one system inside a different, i.e., heterogeneous, system server node. For example, an IBM AS/400 Server SPCN node is not useable inside an IBM PC Company Server box. It would be desirable to overcome this limitation of present SES implementations for the purposes of remote power control, diagnostics, and logical-to-physical correlation, and apply them to a heterogeneous system.

One SES system is known which allows remote power control by one computer system (a network Server) of a different computer system (a networked desktop PC). This SES system is called 'MagicPacket'. This technology requires an Ethernet (or Token Ring) connection (usually a PCI Ethernet cad) in both systems. The controlling node, i.e., usually a Server, can send out a unique 'packet' to the desktop PC to 'wake-it-up.' That is, the Ethernet card in the PC uses the PCI bus 3.3 VAUX A14 pin to maintain standby power to a small amount of logic on the Ethernet card. Upon receiving this special 'packet,' the A19 PME (Power Management Enable) pin which is connected to the main Power Supply is 'raised' turning the power supply 'ON' and the PC powers up.

However, a problem with this known technique is that it is a completely 'dumb' switch. Not only is it not able to turn OFF the PC main power supply, but also it is not capable of detecting any fan or power faults that may occur. These faults ideally should be detected and identified by the Server so maintenance personal can be called.

Another known system, called "Tivoli," is directed to managing a heterogeneous network. Tivoli is the premier IBM Systems Management toolbox used by system integrators to manage heterogeneous computer networks. However, generally speaking, Tivoli can only collect SES information, and generate reports and alerts, and can do so only when the operating system is fully operational. That is, Tivoli cannot manage and 'control' basic low-level SES function. For instance, Tivoli cannot control backplane and chassis VPD EEPROM updates, remote chassis power control, or provide other heterogeneous SES management. Further, Tivoli cannot accomplish any of the management functions prior to the Operating System being completely booted and/or operational.

As mentioned above, there are certain 'low-level' system management capabilities now being added in some systems. Initiatives such as IPMI, DMI, and ZAW, mentioned above, are integrating to broaden the 'control' mechanisms of both system chassis hardware (like power supplies and fans) and service enablers, like logical-to-physical correlation capabilities. That is, they are integrating the control and service capabilities, as well as integrating functions, so they work in concert with each other.

However, these initiatives are not yet completed. Further, as proposed, they cannot connect to and/or control heterogeneous systems, like OS400 and most UNIX platforms, for the purposes of SES.

Therefore, a need exists for an improved system enclosure services (SES) system which permits heterogeneous communications and control.

SUMMARY OF THE INVENTION

It is, therefore, a principle object of this invention to provide a method and apparatus for a heterogeneous system enclosure services connection.

It is another object of the invention to provide a method and apparatus that solves the above mentioned problems so that an SES node from one system may be used with an SES node inside a different system.

These and other objects of the present invention are accomplished by the method and apparatus disclosed herein.

According to an aspect of the invention, a system enclosure services (SES) server node from one system can be used inside a different system. For example, according to an aspect of the invention, an IBM AS/400 SPCN Server node can be used inside a IBM PC Company Server box, for example, for the purposes of remote power control, diagnostics, and logical-to-physical correlation, i.e. to provide system enclosure services.

According to an aspect of the invention, a mainframe or mini-computer system power control network node is disposed on an adapter card which can be plugged into smaller or less powerful heterogeneous network computers. For example, according to an aspect of the invention, an SPCN node is provided on a PCI card which can be plugged into any Netinfinity or IPMI compliant Intel box PCI card slot, and can be used for remote power control and data collection of that chassis, i.e., to provide system enclosure services. A Netinfinity or IPMI compliant Intel box refers to an Intel processor based computer operating, for example, Microsoft NT or Santa Cruz Operation Unix, or its equivalent.

According to an aspect of the invention, a mainframe or mini-computer system can be used to manage system enclosure services for smaller or less powerful heterogeneous network computers. According to an aspect of the invention, an IBM AS/400 computer system box, and the corresponding IBM OS400 Operating System, for example, can be used to manage remote powering on/off of the Netinfinity or IPMI compliant Intel boxes, as well as managing certain 'alerts' generated from Service Processors in these boxes.

According to another aspect of the invention, the 'range' of system enclosure services (SES) is expanded to include heterogeneous communications and control. In particular, according to an aspect of the invention, SES is expanded to implement a portion of SES in two different (heterogeneous) systems.

According to another aspect of the invention, a mainframe or mini-computer can connect to practically any platform designed around industry standard buses and system enclosure services. According to an aspect of the invention, an IBM AS/400 computer system, for example, can connect to virtually any heterogeneous platform designed around standards such as the PCI Bus and their Service Processor/SES connections and interfaces with IPMI and DMI. Standardization allows the connection and permits the management of various aspects of system enclosure services in heterogeneous platforms. The connections allow an IBM AS/400 computer system, for example, to 'power-control' another system.

According to another aspect of the invention, an adapter node is provided for use in adapting internal system enclosure services to a system power control network to thereby provide remote power control, diagnostics, and logical-to-physical correlation information to the system power control network.

According to another aspect of the invention, the adapter node is for use in one computer of a plurality of different types of computers, having a respective internal system enclosure services low-level communication path.

According to another aspect of the invention, the power control network has a plurality of nodes, one of the nodes being a control node.

According to another aspect of the invention, the adapter node includes a substrate having electrical contacts adapted to plug into a system bus connector in the computer to be controlled.

According to another aspect of the invention, the substrate further has at least one system enclosure services interface connection to connect to an internal system enclosure services low-level communication path in the computer.

According to another aspect of the invention, the adapter node further has a system power control network interface connection for connecting to the system power control network.

According to another aspect of the invention, a processor of the adapter node is provided for coordinating communication with the system power control network and with internal devices on the internal system enclosure services low-level communications path.

According to another aspect of the invention, power control, diagnostics, and logical-to-physical correlation information signals are communicated between the system power control system control node and the adapter node to provide system enclosure services support to the one computer of the plurality of different types of computers.

According to another aspect of the invention, a system power control network for a plurality of heterogeneous computers is provided. The network includes a control node disposed in a first computer and at least one other node disposed in a second different computer. A first communications medium interconnects the first node and the at least one other node. An internal system enclosure services low-level communications path is disposed in the second computer. The at least one other node includes an adapter which interfaces the internal system enclosure services low-level communications path with the first communications medium.

According to another aspect of the invention, the adapter includes a first connector for plugging into a system bus of the second computer, a second connector for connecting to the internal system enclosure services low-level communications path, a third connector for connecting to the first communications medium, and a processor for controlling auxiliary power and issuing commands on the internal system enclosure services low-level communications path, and the first communications medium, through the second and third connectors, respectively.

According a further aspect of the invention, the system bus of the second computer includes a peripheral component interconnect bus, and the first connector includes a peripheral component interconnect bus connector having pins for enabling power management and for obtaining auxiliary power even when the second computer is powered off.

For example, according to another aspect of the invention, the peripheral component interconnect bus includes a power management enable connection (PME) and a standby power connection (3.3 VAUX). The adapter plugs into a PCI bus slot connector but only uses the power management enable (PME) signal pin and the 3.3 volt auxiliary (3.3 VAUX) power pin. The adapter processor is operational to turn the second computer on and off using the power management enable connection or an external power connection, and to operate on power obtained through either the standby power connection or the external power source when the second computer is in an off state.

According to another aspect of the invention, the adapter includes readable and writable memory, and the adapter processor is operational to exchange data and commands on the internal system enclosure services low-level communications path, and the first communications medium, through the second and third connectors, respectively, based on operating code stored in the memory.

According to an aspect of the invention, the second computer includes a system enclosure services (SES) processor connected to the internal system enclosure services low-level communications path, which performs system service function in cooperation with the adapter processor.

According to an aspect of the invention, the adapter has the capability to either communicate logical to physical correlation to the second computer's system enclosure processor's operator panel (OP panel) or to control a series of segmented light emitting diodes (LED's) mounted directly to the adapter.

According to an aspect of the invention, the second computer includes an bus bridge/input-output processor (BB/IOP) which interconnects the second computer system bus with a system bus of the first computer on a second communications medium. The BB/IOP is addressed by an operating system of the first computer through the second communications medium using a logical address. The BB/IOP is connected to the adapter processor to provide physical location information. In this way, a logical address-to-physical location correlation can be accomplished by reading the physical location information from the adapter through the second communications medium using the BB/IOP logical address.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1A:
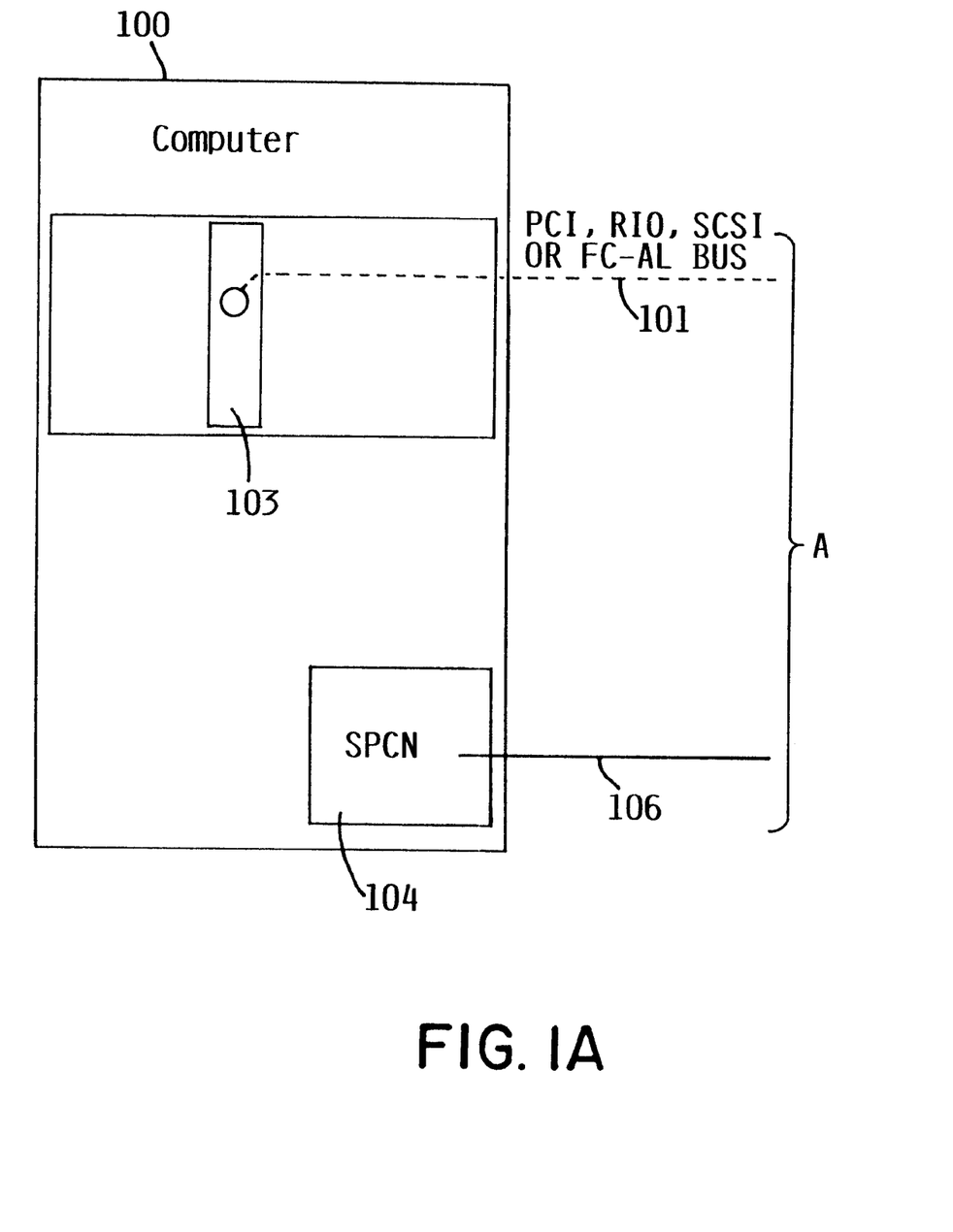
FIG. 1 illustrates an implementation of heterogeneous system enclosure services according to an exemplary embodiment of the present invention.
Figure 1B:
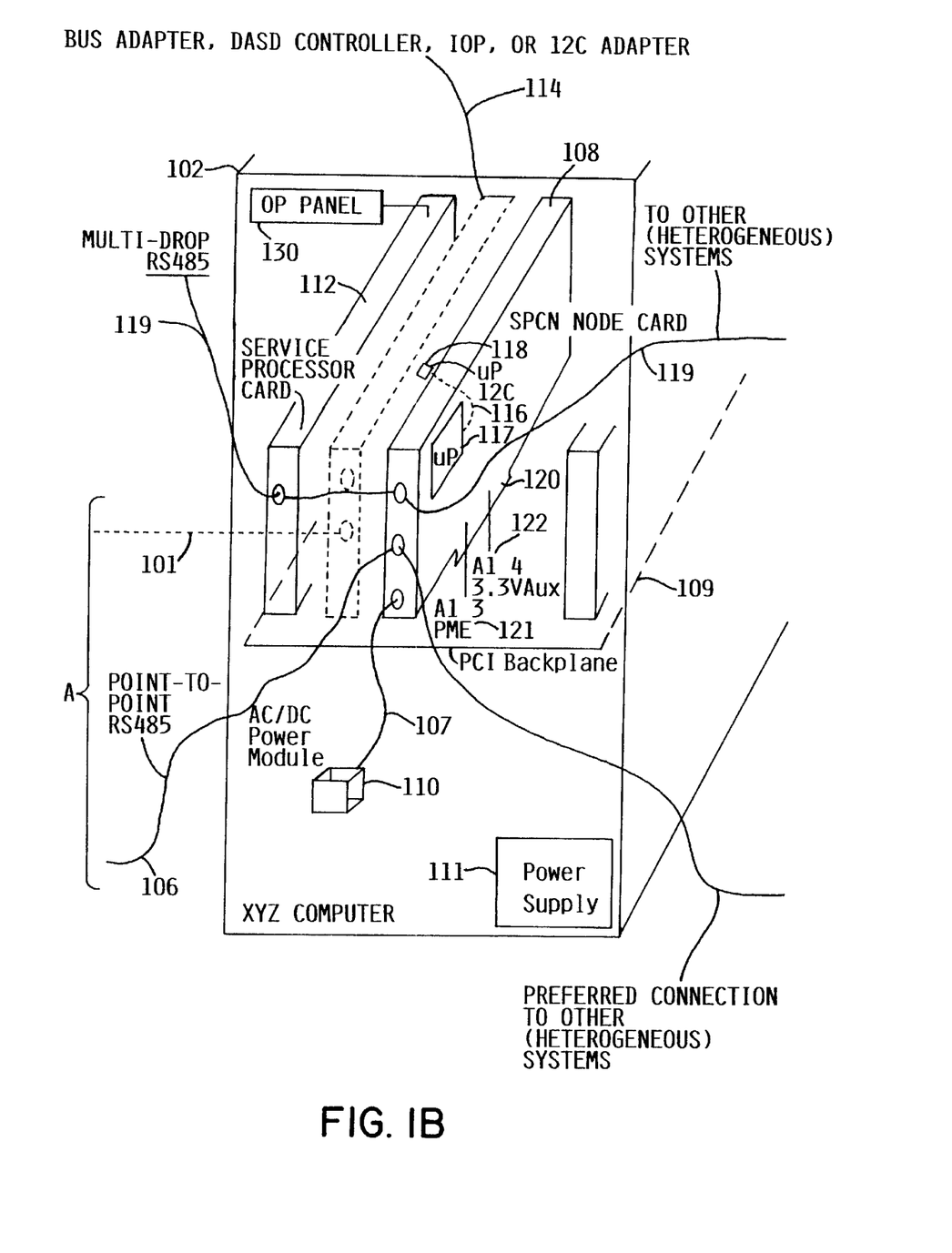

FIG. 1 shows an exemplary implementation of various aspects of the invention. A central computer 100, e.g., an IBM AS/400, and a dissimilar remote "XYZ" computer 102, are provided. The two computers 100 and 102 may be functionally interconnected by communication medium 101, in particular, a system bus 101, and bus controller 103. The bus 101 could be a PCI bus, a proprietary bus (e.g. the IBM remote input/output "RIO" bus), a parallel SCSI bus, or a serial SCSI bus (FC-AL), for example. Additional "XYZ" computers (not shown) could be connected to the central computer 100 as well.

A system power control network (SPCN), such as was described in the Background section above, interconnects the central computer 100 and the "XYZ" computer 102 (and any further computers, not shown). In particular, computer 100 includes an SPCN node 104 which is connected to other SPCN nodes on an SPCN communications medium 106, e.g., an RS485 point-to-point serial bus. Computer 102 has an SPCN node card 108 which is connected to the SPCN medium 106. Preferably, the SPCN node card 108 is a PCI card connected to a PCI backplane 109 in the XYZ computer 102.

Computer 100 may be an IBM AS/400 computer system box, and the corresponding OS400 Operating System, can be used to manage remote powering on/off of the XYZ computers 102, e.g., Netinfinity or IPMI compliant Intel boxes, as well as managing certain 'alerts' generated from Service Processors 112 in these boxes.

Any additional XYZ computers (not shown) can be connected to SPCN medium 106 either directly, through a continuation of point-to-point RS485 segments, or indirectly via the multi-drop RS485 connection 119. The preferred way is the former, i.e., directly through the point-to-point SPCN connection. Of course, the preferred exemplary RS485 bus specification is shown for explanation purposes, it being understood that other serial bus standards, e.g., RS232, or parallel bus standards could be used, as would be apparent to one skilled in the art, and such would be considered to be within the spirit and scope of the invention.

The computer 102 could be an IBM PC Company Server box, for example, and the SPCN node adapter card 108 could be an IBM AS/400 SPCN Server node for the purposes of remote power control, diagnostics, and logical-to-physical correlation, i.e. to provide system enclosure services. For example, the SPCN node may be provided on a PCI card which can be plugged into any Netinfinity or IPMI compliant Intel box PCI card slot.

The SPCN node card 108 has an optional connection to an AC/DC power module 110 which can be used to provide the standby power required for the SPCN node card 108 when the XYZ computer is powered off. However, ideally standby power is provided by the 1.75 amps of 3.3 VAUX supplied through pin A14 (122) on the standard PCI bus into which the card 108 is plugged. Although the adapter card plugs into a standard PCI slot connector, it only utilizes the auxiliary power connection, and the power management enable (PME) connection pin A19 (121), in this embodiment. Of course, other configurations are possible within the spirit of the invention, that is, the adapter card could be configured to plug into a different bus standard slot connector, and/or utilize different auxiliary power and power management control mechanisms.

The SPCN node card 108 can assign logical-to-physical correlation to the XYZ box by displaying the box identification information (ID) to optional segmented light emitting diodes (LED's—see FIG. 2—item 220) mounted on the adapter card, or by commanding the service processor card 112 to display the ID on the local operator panel 130 (OP panel) of the XYZ computer. The preferred method would be to display the ID on the OP panel.

In either case, the logical-to-physical correlation for the bus adapter, DASD controller, IOP or I2C adapter card 114, if it exists, would preferably be delivered to the operating system by writing the ID from the SPCN node card 108 to the bus bridge/input-output processor (BB/IOP) 118 thereon.

The XYZ computer 102 has a power supply 111 which can be controlled by SPCN with the SPCN node card 108. The XYZ computer 102 illustrated has a service processor card 112 which implements internal system enclosure services (SES). The 'switch' to turn on the XYZ computer 102 can be made through a simple I/O signal defined by the PCI bus A19 PME (Power Management Enable) pin 121 on the PCI backplane 109, for example.

Alternatively, the SPCN card 108 could use a more complex interface, such as the illustrated multi-drop RS485 connection 119 to issue power-up/power-down commands and receive various SES faults or 'alerts' generated by the XYZ computer Service Processor 112.

The XYZ computer 102 may, as illustrated, have a bus adapter, DASD controller, IOP, or I2C bus adapter card 114, or a combination of all of the above, coupled to the computer 100 on medium 101. This card 114 may also be coupled to the SPCN node card 108 through a bus 116 to enable logical-to-physical correlation, as will be described in more detail later. In particular, an I2C bus connection 116 is provided between micro-processing engine ($\mu$p) 117 on the SPCN node card 108 and a microprocessor 118 on the card 114.

The SPCN node card 108 has micro-processing engine ($\mu$p) 117 on-board to process both a standard protocol, e.g., IBM AS/400 SPCN (e.g., RS485 bus) protocol, and other industry standard SES interfaces as they are developed. Since the SPCN Node card 108 is part of the SPCN network, it can also download new code-loads to programmable memory 201 (e.g., EEPROM—see FIG. 2) associated with the $\mu$p 117 to handle changes for the industry standard interfaces as they evolve.

The 'range' of system enclosure services (SES) can be expanded to include heterogeneous communications and control. In particular, SES is expanded to implement a portion of SES in two different systems (heterogeneous) running different operating systems. With the adapter according to the invention, a mainframe or mini-computer can connect to practically any platform designed around industry standard buses and system enclosure services. For example, an IBM AS/400 computer system can connect to virtually any heterogeneous platform designed around standards such as the PCI Bus and their Service Processor/SES connections and interfaces with IPMI and DMI. Standardization allows the connection and permits the management of various aspects of system enclosure services in heterogeneous platforms.

If the computer 100, e.g., an IBM AS/400, and the XYZ computer 102 share a 'functional path', i.e., through a bus bridge chip, in addition to the SPCN Node connection, an additional logical-to-physical connection may also be added as illustrated. For example, if the system interconnect medium 101 is a PCI bus, the SPCN node card 108 μp 117 and the card 114 microprocessor 118 could be connected via the I2C bus 116. Since SPCN assigns physical box ID's to each SPCN node, that ID could be loaded in the card 114 microprocessor 118 by the SPCN node 108 and thereby communicated to the IBM AS/400 Operating System when the card 114 is queried via a logical address on the system bus 101.

Alternatively, if the 'functional path' 101 is FC-AL (a Serial SCSI bus), or ANSI SCSI (a parallel bus), the XYZ computer card 114 might contain a ANSI SCSI SES μp chip (118), and again the I2C connection 116 to the SPCN node card 108 could be made.

Also, if the functional path and card 114 are added, the card 114 μp 118 could be used to process some, or all, of the RS485 commands. In the latter case, there would be a private bus between the SPCN node card 108 and the card 114. This private bus could be a command-response protocol over the same I2C bus 116, or a separate (simpler) RS232 or RS485 connection, for example, to communicate (i.e., relay) power on/off from SPCN to the Service Processor card 112 multi-drop RS485 connection 119.

As would be appreciated by one skilled in the art, any number of alternative configurations are possible, and such are considered to be contemplated within the spirit of the invention.

Figure 2:
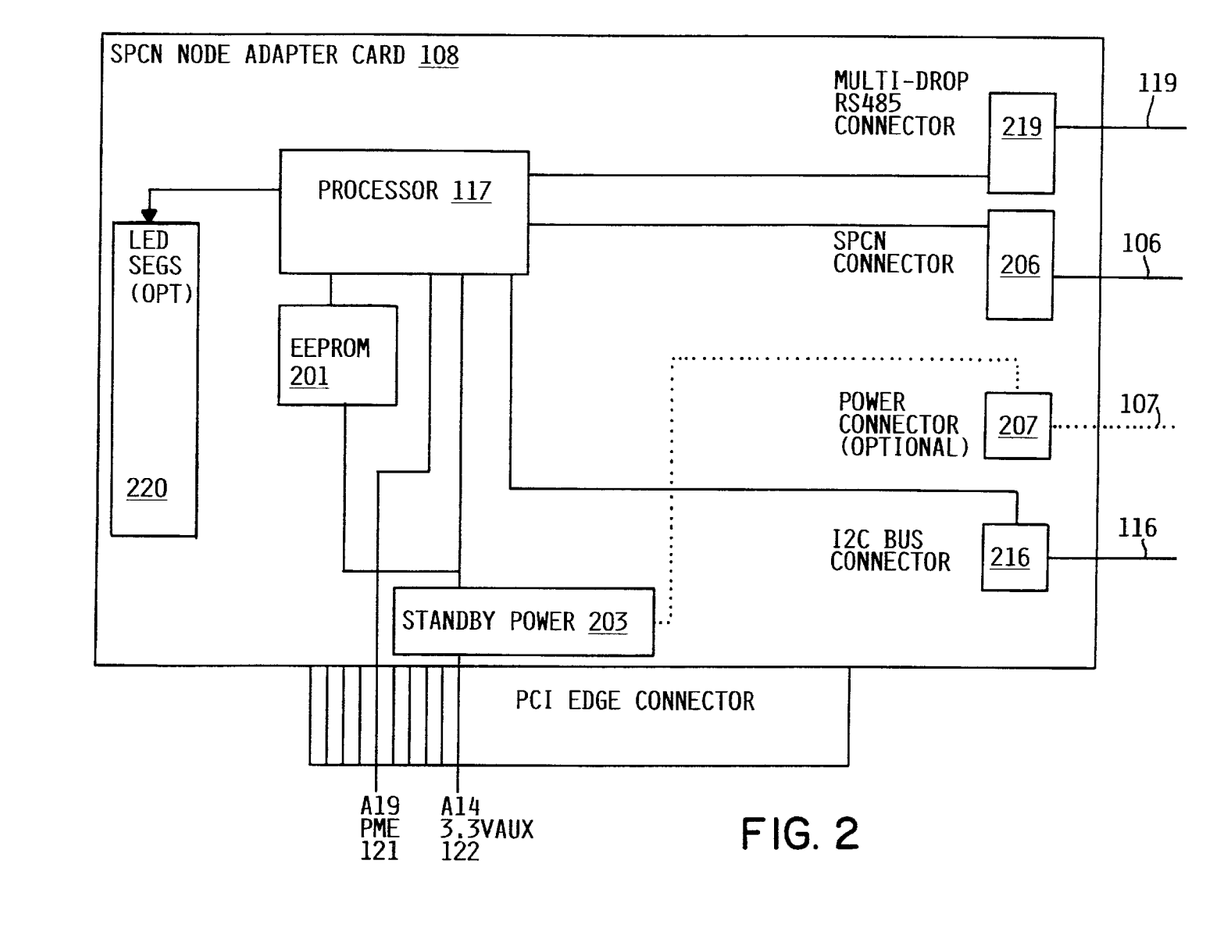
FIG. 2 illustrates an adapter node card according to an exemplary embodiment of the invention.

With reference to FIG. 2, an exemplary SPCN node adapter card 108 is shown. Connections 206, 207, 216 and 219 connect the card processor 117 as previously described with respect to FIG. 1 on lines 106 (point-to-point RS485), 107 (optional power), 116 (I2C bus to card 114 microprocessor 118) and 119 (multi-drop RS485 connection), respectively. A standby power block 203 is illustrated which receives the standby power either from the PCI 3.3 VAUX pin (A14) 122 or from an AC/DC power module 110 via line 107 and optional power connection 207, for example. An EEPROM 201 is also illustrated associated with the processor 117, for storing SES code, and the like, as previously described.

On the PCI edge connector, which plugs into a corresponding PCI bus slot connector on a backplane, the power management enable (PME) pin (A19) 121 and the auxiliary power (3.3 VAUX) A14 pin 122 are shown. The adapter card 108 does not require connection to any other PCI bus pins besides pins 121 and 122 (A19 and A14). The SPCN node adapter card processor 117 can control the PME pin 121 to turn ON and OFF power supply 111 of the computer 102, as already described above.

Optional segmented LED's 220 are shown for displaying the logical to physical correspondence, as previously described, under control of the processor 117. However, the preferred method would be to display the information on the XYZ computer 102 OP panel (FIG. 1) according to the previously described mechanism.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof.

A person skilled in the art would realize that there may be other equivalent components presently known, or to be developed, which could be used within the spirit and scope of the invention defined by the claims.

What is claimed is:

1. An adapter node for use in adapting internal system enclosure services to a system power control network to thereby provide remote power control, diagnostics, and logical-to-physical correlation information to the system power control network, the adapter node for use in one computer of a plurality of different types of computers, the one computer having a respective internal system enclosure services low-level communication path, the power control network having a plurality of nodes, one of the nodes being a control node, the adapter node comprising:

a substrate having electrical contacts adapted to plug to a system bus in the one computer, having at least one system enclosure services interface connection to connect to the internal system enclosure services low-level communication path in the one computer, and having a system power control network interface connection for connecting to the system power control network; and a processor for coordinating communication with the system power control network and with internal devices on the internal system enclosure services low-level communications path;

whereby power control, diagnostics, and logical-to-physical correlation information signals are communicated between the system power control system control node and the adapter node to provide system enclosure services support to the one computer of the plurality of different types of computers.

2. The adapter node according to claim 1, further comprising memory associated with the adapter node processor, for storing system enclosure services code.

3. The adapter node according to claim 2, wherein the memory comprises electrically erasable programmable read only memory.

4. The adapter node according to claim 1, further comprising a standby power connection for providing standby power to the adapter node processor when the one computer is in an OFF or STANDBY state.

5. The adapter node according to claim 4, wherein the system bus comprises a peripheral component interconnect bus, and wherein the standby power connection comprises a 3.3 volt auxiliary pin of the bus.

6. The adapter node according to claim 4, wherein the standby power connection comprises an AC/DC power module.

7. The adapter node according to claim 1, further comprising a power control connection for enabling power control of the one computer by the adapter node.

8. The adapter node according to claim 7, wherein the system bus comprises a peripheral component interconnect bus, and wherein the power control connection comprises the power management enable pin of the bus.

9. The adapter node according to claim 1, wherein the system enclosure services interface connection to the internal system enclosure services low-level communication path in the one computer comprises one of: a point-to-point bus connection or a multi-drop bus connection.

10. The adapter node according to claim 1, wherein the control node is disposed in a central computer, wherein the one computer has a bus device which connects to a system bus of the central computer, and wherein the adapter node further comprises a bus device interface connection for connecting the adapter node to the bus device to provide physical location information from the system power control network to the bus device which can be used by the central computer to correlate a logical address on the system bus with a physical location.

11. The adapter node according to claim 1, wherein the one computer has a system enclosure processor coupled to the adapter node and to an operator panel of the one computer, and wherein logical to physical correlation information is communicated to the system enclosure processor for display on the operator panel upon command from the control node.

12. The adapter according to claim 1, wherein the adapter node further comprises a plurality of light emitting diodes controlled by the adapter node processor, and wherein logical to physical correlation information can be displayed on the light emitting diodes.

13. A system having a power control network for a plurality of heterogeneous computers, comprising:
   a control node and at least one other node, the control node being disposed in a first computer and the at least one other node being disposed in a second computer, respectively, the first and the second computers having heterogeneous operating systems;
   a first communications medium interconnecting the first node and the at least one other node;
   an internal system enclosure services low-level communications path disposed in the second computer and having a known protocol and command set; and
   wherein the at least one other node comprises an adapter providing functional interfacing between the internal system enclosure services low-level communications path and the first communications medium.

14. The system according to claim 13, wherein there is a system bus interconnecting the first computer and the second computer, and wherein the adapter comprises:
   a first connector for plugging to a system bus of the second computer;
   a second connector for connecting to the internal system enclosure services low-level communications path;
   a third connector for connecting to the first communications medium;
   a processor for exchanging data and commands on the internal system enclosure services low-level communications path, and the first communications medium, through the second and third connectors, respectively; and
   a fourth connector for providing logical-to-physical correlation of a device in the second computer on the system bus interconnecting the first computer and the second computer.

15. The system according to claim 14, wherein the system bus of the second computer comprises a peripheral component interconnect bus, and wherein the first connector comprises a peripheral component interconnect bus connector.

16. The system according to claim 15, wherein the peripheral component interconnect bus connector includes a power management enable connection and a standby power connection; and wherein the adapter processor is operational to turn the second computer on, off and/or put on standby using the power management enable connection, and to operate on power obtained through the standby power connection when the second computer is in an off or a standby state.

17. The system according to claim 14, wherein the adapter further comprises readable and writable memory; and wherein the adapter processor is operational to exchange data and commands on the internal system enclosure services low-level communications path, and the first communications medium, through the second and third connectors, respectively, based on operating code stored in the memory.

18. The system according to claim 14, wherein the second computer includes a system enclosure services processor device connected to the internal system enclosure services low-level communications path, which performs system service function, and that can be queried or commanded through the adapter processor.

19. The system according to claim 14, wherein the second computer includes a bus bridge/input-output processor device which bridges the second computer system bus with the system bus interconnecting the first computer and the second computer, the bus bridge/input-output processor being addressed by an operating system of the first computer through the system bus interconnecting the first computer and the second computer using a logical address;
   wherein the adapter node processor is connected to the bus bridge/input-output processor device to provide physical location information through the fourth connector,
   whereby a logical address-to-physical location correlation can be accomplished by reading the physical location information from the bus bridge/input-output processor device through the system bus interconnecting the first computer and the second computer using the logical address.

20. The system according to claim 19, wherein the system bus interconnecting the first computer and the second computer comprises one of:
   a peripheral component interconnect bus;
   a parallel small computer systems interconnect bus;
   a serial small computer systems interconnect bus; or
   a proprietary computer system bus.

21. The system according to claim 19, wherein the second computer has a system enclosure processor coupled to the adapter and to an operator panel of the second computer, and wherein logical to physical correlation information is communicated to the system enclosure processor for display on the operator panel upon command from the control node.

22. The system according to claim 19, wherein the adapter further comprises a plurality of light emitting diodes controlled by the adapter processor, and wherein logical to physical correlation information can be displayed on the light emitting diodes.

23. The system according to claim 13, wherein the second computer comprises one of:

an intelligent workstation;

a personal computer; or a server.

24. A method of interfacing a plurality of heterogeneous computers to implement a system power control network, comprising the steps of:

providing an adapter node for use in adapting internal system enclosure services to the system power control network to thereby provide remote power control, diagnostics, and logical-to-physical correlation information to the system power control network, the adapter node for use in one computer of a plurality of different types of computers, the one computer having a respective internal system enclosure services low-level communication path, the power control network having a plurality of nodes, one of the nodes being a control node, the adapter node comprising a substrate having electrical contacts adapted to plug to a system bus in the one computer, having at least one system enclosure services interface connection to connect to the internal system enclosure services low-level communication path in the one computer, and having a system power control network interface connection for connecting to the system power control network, and a processor for coordinating communication with the system power control network and with internal devices on the internal system enclosure services low-level communications path;

plugging the electrical contacts of the substrate to a system bus in the one computer;

connecting the at least one system enclosure services interface connection to the internal system enclosure services low-level communication path in the one computer; and connecting the system power control network interface connection to the system power control network;

whereby power control, diagnostics, and logical-to-physical correlation information signals are communicated between the system power control system control node and the adapter node to provide system enclosure services support to the one computer of the plurality of different types of computers.

25. A method of connecting at least two heterogeneous platforms for facilitating system enclosure services, comprising:

providing a system enclosure services control node in a first platform of the at least two heterogeneous platforms;

providing a system enclosure services adapter in at least one of the at least two heterogeneous platforms different from the first platform; and connecting the system enclosure services adapter in the at least one of the at least two heterogeneous platforms to a communications medium which carries systems enclosure services information, including commands or data, to and from the first platform control node;

wherein system enclosure services support is provided to the at least one of the at least two heterogeneous platforms different from the first platform through the communications medium.

26. The method according to claim 25, wherein the at least one of the at least two heterogeneous platforms different from the first platform has an operating system different from an operating system of the first platform.

27. The method according to claim 25, wherein at least one of the at least two heterogeneous platforms different from the first platform includes an enclosure containing at least one direct access storage device (DASD).

28. An apparatus for providing system enclosure services to heterogeneous platforms, at least one of the heterogeneous platforms being a server, and at least one other of the heterogeneous platforms having a system enclosure services control node, comprising:

a communications medium for carrying system enclosure services information, including commands or data, to and from the system enclosure services control node; and an adapter in the server, for sending and receiving system enclosure services information to and from the system enclosure services control node.

29. The apparatus according to claim 28, wherein the at least one other platform having the system enclosure services control node has a first operating system; and wherein the server has a second operating system different from the first operating system.

30. The apparatus according to claim 28, wherein the server comprises an enclosure containing at least one direct access storage device (DASD).

* * * * *